US012604805B2

(12) United States Patent
Somers et al.

(10) Patent No.: US 12,604,805 B2
(45) Date of Patent: Apr. 21, 2026

(54) COMBINE HARVESTER WITH NEAR INFRARED GRAIN SENSOR

(71) Applicant: CNH Industrial America LLC, New Holland, PA (US)

(72) Inventors: Tom N.N. Somers, Maria Aalter (BE); Steven G.M. Van Overbeke, Maldegem (BE); Michiel Vanderstichele, Merken (BE); Pieter Vandevelde, Sint Michiels Brugge (BE)

(73) Assignee: CNH Industrial America LLC, New Holland, PA (US)

( * ) Notice: Subject to any disclaimer, the term of this patent is extended or adjusted under 35 U.S.C. 154(b) by 971 days.

(21) Appl. No.: 17/775,116

(22) PCT Filed: Nov. 6, 2020

(86) PCT No.: PCT/EP2020/081283
§ 371 (c)(1),
(2) Date: May 6, 2022

(87) PCT Pub. No.: WO2021/089780
PCT Pub. Date: May 14, 2021

(65) Prior Publication Data
US 2022/0377977 A1 Dec. 1, 2022

(30) Foreign Application Priority Data
Nov. 6, 2019 (EP) .................................... 19207507

(51) Int. Cl.
*A01D 41/127* (2006.01)
*A01D 61/04* (2006.01)

(52) U.S. Cl.
CPC ......... *A01D 41/1277* (2013.01); *A01D 61/04* (2013.01)

(58) Field of Classification Search
CPC ........ A01D 41/00–41/16; A01D 61/04; A01D 41/1277
See application file for complete search history.

(56) References Cited

U.S. PATENT DOCUMENTS

| | | | |
|---|---|---|---|
| 6,282,967 B1 * | 9/2001 | Homburg | A01D 41/1272 73/861 |
| 7,169,040 B2 * | 1/2007 | Kormann | A01D 41/1277 460/7 |

(Continued)

FOREIGN PATENT DOCUMENTS

| | | | |
|---|---|---|---|
| CN | 108921842 A | * | 11/2018 |
| EP | 0967495 A2 | * | 12/1999 |

(Continued)

OTHER PUBLICATIONS

International Search Report and Written Opinion for PCT Application No. PCT/EP2020/081283 dated Feb. 11, 2021 (13 pages).

(Continued)

*Primary Examiner* — Joseph M Rocca
*Assistant Examiner* — Madeline I Runco
(74) *Attorney, Agent, or Firm* — Dority & Manning. P.A.

(57) ABSTRACT

A combine harvester including a grain elevator for transporting and elevating harvested grain. The grain elevator includes a paddle loop, a driver, an elevator housing, and a sensor assembly. The paddle loop has a plurality of paddles for carrying the harvested grain. The driver is arranged for driving the paddle loop and thereby moving the paddles upward at a first side of the paddle loop and downward at a second side of the paddle loop. The elevator housing encompasses at least a portion of the paddle loop. The sensor assembly comprises a NIR sensor for detecting properties of the harvested grain and a sensor window arranged for enabling infrared light to travel between the NIR sensor and (Continued)

the harvested grain. The sensor window is embedded in the elevator housing, adjacent the first side of the paddle loop.

10 Claims, 5 Drawing Sheets

(56)                    References Cited

U.S. PATENT DOCUMENTS

| | | | | |
|---|---|---|---|---|
| 7,372,034 | B2 * | 5/2008 | Kormann | A01D 41/1277 |
| | | | | 250/341.8 |
| 10,085,379 | B2 | 10/2018 | Schleusner et al. | |
| 10,941,001 | B2 * | 3/2021 | Batcheller | B07C 5/3425 |
| 11,197,417 | B2 * | 12/2021 | Corban | H04N 23/57 |
| 11,818,982 | B2 * | 11/2023 | Corban | H04N 23/51 |
| 2010/0110428 | A1 | 5/2010 | Priesnitz et al. | |
| 2012/0004815 | A1 * | 1/2012 | Behnke | A01D 41/1277 |
| | | | | 701/50 |
| 2014/0050364 | A1 * | 2/2014 | Brueckner | G06V 20/68 |
| | | | | 382/110 |
| 2014/0262548 | A1 * | 9/2014 | Acheson | G01G 21/23 |
| | | | | 177/136 |
| 2015/0009328 | A1 * | 1/2015 | Escher | A01D 75/00 |
| | | | | 348/148 |
| 2016/0189007 | A1 * | 6/2016 | Wellington | G06V 20/695 |
| | | | | 382/110 |
| 2017/0045444 | A1 * | 2/2017 | Haiges | G01N 21/359 |
| 2017/0088357 | A1 * | 3/2017 | Boydell | B65G 19/14 |
| 2017/0112057 | A1 * | 4/2017 | Loukili | A01D 41/127 |
| 2017/0311543 | A1 * | 11/2017 | Leenknegt | A01F 12/52 |
| 2020/0281119 | A1 * | 9/2020 | Sander | G01N 21/3563 |
| 2021/0349014 | A1 * | 11/2021 | Haiges | G01N 21/359 |
| 2022/0053692 | A1 * | 2/2022 | Fischer | G06V 20/68 |
| 2022/0057322 | A1 * | 2/2022 | Fischer | G01N 21/33 |
| 2022/0375115 | A1 * | 11/2022 | Missotten | G06T 7/0004 |
| 2023/0243761 | A1 * | 8/2023 | Somarowthu | A01F 15/08 |
| | | | | 701/50 |
| 2024/0172590 | A1 * | 5/2024 | Duquesne | A01D 41/1276 |
| 2024/0334872 | A1 * | 10/2024 | Blank | A01D 41/127 |

FOREIGN PATENT DOCUMENTS

| | | |
|---|---|---|
| GB | 2088808 A | 6/1982 |
| WO | 2014/143759 A1 | 9/2014 |

OTHER PUBLICATIONS

Extended European Search Report for EP Application No. 19207507.5 dated May 13, 2020 (7 pages).

* cited by examiner

COMBINE HARVESTER WITH NEAR INFRARED GRAIN SENSOR

TECHNICAL FIELD

The present invention relates to a combine harvester comprising a grain elevator and a NIR sensor assembly for detecting properties of harvested grain transported by the grain elevator.

BACKGROUND

Combine harvesters, also commonly called 'combines', harvest grain from the field and separate the grain kernels from all the other material in the harvested crop. This other material is commonly named 'material other than grain' or MOG and comprises, e.g., straw, leaves, ears and chaff. This separation involves different process stages. In a threshing section, the grain kernels are separated from the chaff and the plant. A subsequent separation section further separates the straw and other larger parts in the grain-MOG mixture from the smaller grain kernels and the chaff. Then, a cleaning section, typically comprising a blower for blowing away the light-weight chaff and a set of reciprocating sieves for only letting through the grain kernels, separates the heavier grain kernels from the lighter chaff.

During the threshing, separation and cleaning of the harvested grain, the grain moves downwards from the threshing and separation sections to the cleaning section. In the cleaning sections, the grain kernels typically fall down through an upper and a lower sieve, onto an inclined grain collection plate, before being collected in a clean grain auger at or near the bottom of the combine harvester chassis. A grain elevator then picks up the clean grain and transports it upwards for collection in a large clean grain tank that is installed on top of the combine harvester. The grain elevator is typically formed by a chain or belt driven loop comprising a plurality of paddles for picking up the clean grain near a downstream end of the clean grain auger and to transport it upwards to the top of the grain elevator, where the clean grain is loaded into the clean grain tank, possibly via one or more further augers.

The US patent application published as US 2010/0110428 A1 describes such a combine harvester with a chain-driven paddle conveyor for transporting the clean grain upwards in the direction of the clean grain tank. At the outlet of the grain elevator, a NIR sensor is placed for measuring grain parameters of the grain that is going into the clean grain tank. It has, however, been observed that signals from this sensor can be insufficiently reliable. For example, when harvesting at low capacity, the volumes of the harvested grain passing the sensor are low and there is no consistent flow of grain past the sensor, which will significantly influence the quality of the measurements done by the sensor.

It is an aim of the present invention to address one or more disadvantages associated with the prior art.

SUMMARY OF THE INVENTION

According to the invention this object is achieved by providing a combine harvester comprising a grain elevator for transporting and elevating harvested grain from a lower point proximate a downstream end of a cleaning section of the combine harvester to a higher point proximate a grain inlet of a grain tank of the combine harvester. The grain elevator comprises a paddle loop, drive means, an elevator housing and a sensor assembly. The paddle loop comprises a plurality of paddles for carrying the harvested grain. The drive means are arranged for driving the paddle loop and thereby moving the paddles upward at a first side of the paddle loop and downward at a second side of the paddle loop. The elevator housing encompasses at least a portion of the paddle loop. The sensor assembly comprises a NIR sensor for detecting properties of the harvested grain and a sensor window arranged for enabling infrared light to travel between the NIR sensor and the harvested grain. The sensor window is embedded in the elevator housing, adjacent the first side of the paddle loop.

With the improved positioning of the NIR sensor, in close proximity of the upward channel of the grain elevator, it is ensured that in most common circumstances, even when harvesting at relatively low capacity, there will be a consistent flow of grain kernels passing close to the sensor window. The more consistent flow of grain kernels along the sensor window leads to a more reliable measurement of the relevant grain parameters.

Preferably, the sensor window is embedded in the elevator housing at a position where, in use, harvested grain carried upward by one of the paddles gets in sliding contact with the sensor window. It has been observed that the NIR sensor delivers the most accurate and reliable measurement results when the grain being examined gets very close to or in direct contact with the sensor window. By selecting an appropriate clearance between the sensor window and the outer ends of the paddles passing that window, a sliding contact of some of the transported grain with the sensor window is obtained. A preferred maximum clearance between the outer end of the paddles and the sensor window could e.g. be between about 10 mm and about 35 mm, e.g. 20 mm or 25 mm.

Optionally, an angle between the sensor window and an upper surface of a passing paddle is between about 40° and about 120°, preferably between about 60° and about 100°, when an outer end of the passing paddle is closest to a centre of the sensor window. The inclination of the sensor window creates a leakage effect near its upstream end. The extra clearance between the paddle end and the elevator housing results in an accumulation of grain in the zone wherein the sensor window is embedded and thereby provides a more continuous flow of grain and a more accurate and reliable measurement of the grain parameters.

Alternatively or additionally, the elevator housing comprises a leak zone, the leak zone being configured such that, in use, a clearance between an outer end of the paddles and the elevator housing is larger in the leak zone than immediately upstream and downstream thereof, the sensor window at least partly being provided in the leak zone. Grain accumulation in such a leak zone, caused by a slight widening of the grain transport channel of the grain elevator, results in a more continuous and uninterrupted flow of grain kernels along that sensor window and thereby contributes to the sensor assembly's accuracy and reliability.

In preferred embodiment, the sensor window is embedded in a lower half of the elevator housing, where the grain flow is more continuous than in the upper part. Especially when harvesting at low capacity, the sensor assembly may provide much better results when installed in the lower half of the elevator housing.

The elevator housing may comprise a concave portion at its bottom and a substantially straight portion above the concave portion, and the sensor window may at least partially be embedded in the substantially straight portion of the elevator housing. Preferably, however, the sensor window is at least partially embedded in the concave portion of the elevator housing. The inventors have found that very good measurement conditions can be found in the zone where the grain flow is redirected from horizontal (in the clean grain auger) to vertical (in the grain elevator). This change of flow direction takes place adjacent the concave bottom of the grain elevator where the returning paddles from the second side of the paddle loop pick up the grain kernels and start transporting the picked-up grain upwards at the first side of the paddle loop. The paddle loop loops around an upper and a lower rotational axis, and the sensor window may be embedded in the elevator housing at a position that is above, at or below the lower rotational axis.

BRIEF DESCRIPTION OF THE DRAWINGS

Embodiments of the invention will now be described by way of example with reference to the accompanying drawings, in which.

DETAILED DESCRIPTION

Figure 1:
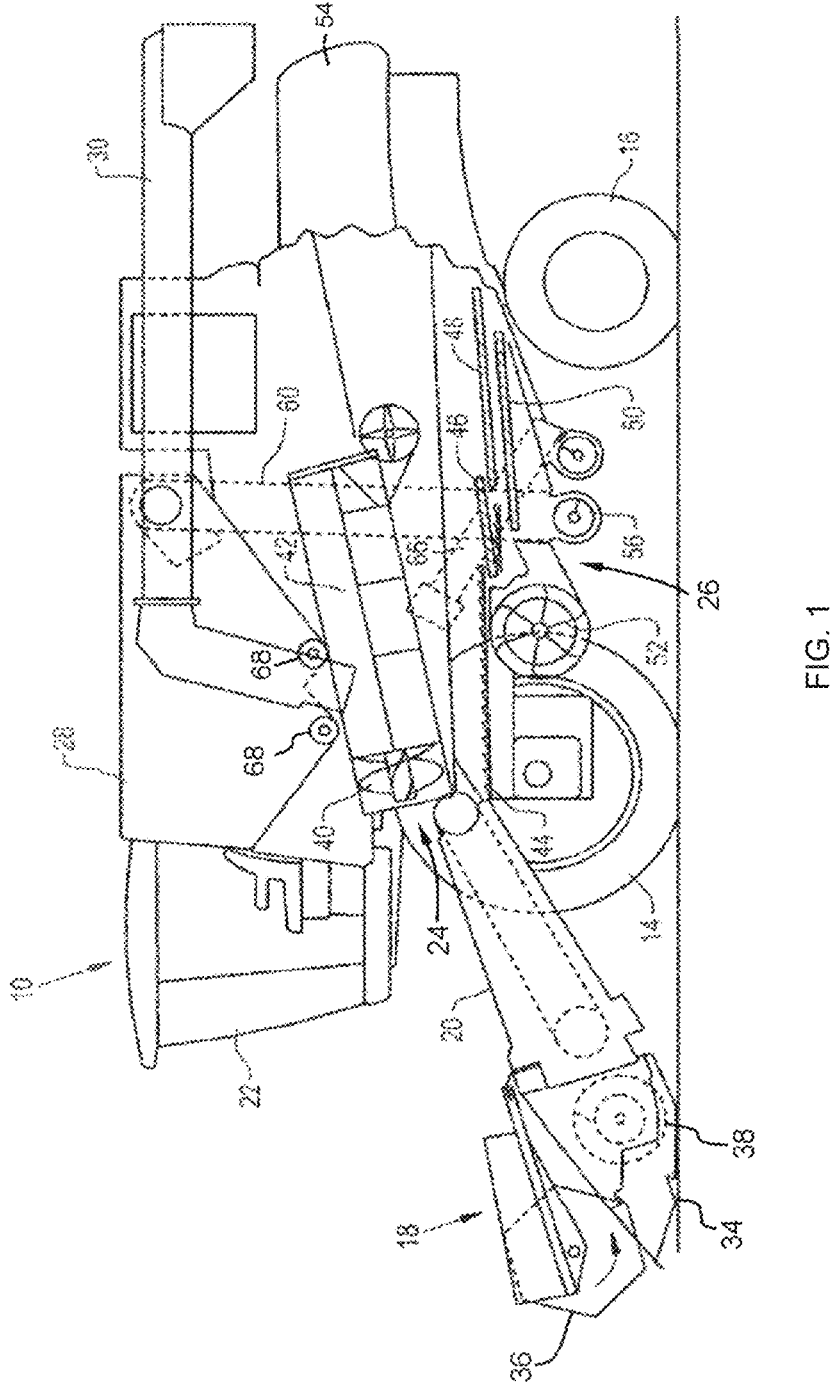
FIG. 1 shows an agricultural harvester in accordance with an embodiment of the invention.

FIG. 1 shows a an agricultural harvester in the form of a combine harvester 10, which generally includes front and rear round engaging wheels 14, 16, a header 18, a feeder 20, an operator cabin 22, a threshing and separation system 24, a cleaning system 26, a grain tank 28 and an unloading auger 30. It should be appreciated that while the agricultural harvester is shown as a combine harvester 10, the agricultural harvester according to the present invention may be embodied by any construction that allows for crop material to be harvested, such as a conventional combine (which does not have a rotor), rotary combine, hybrid combine, chopper harvester, etc.

A header 18 is mounted to the front of the combine harvester 10 and includes a cutter bar 34 for severing crops from a field during forward motion of the combine. A rotatable reel 36 feeds the crop into the header 18, and a double auger 38 feeds the severed crop laterally from each side towards the feeder 20. The feeder 20 conveys the severed crop to the threshing and separating system 24.

The threshing and separating system 24 is of the axial-flow type and comprises a threshing rotor 40 at least partially located and rotatable within a threshing drum 42. The threshing drum may take the form of a perforated concave. Grain from the severed crop is threshed and separated from the MOG by the action of the threshing rotor 40 within the threshing drum 42. Larger elements of MOG, such as stalks and leaves do not pass through the perforations in the threshing drum 42 and are discharged from the rear of the combine harvester 10. Grain and smaller elements of MOG (small MOG henceforth), such as chaff, dust and straw are small enough to pass through the perforations in the threshing drum 42 and are thence discharged from the threshing and separation system 24.

Grain and small MOG that has successfully passed the threshing and separating system 24 falls onto a preparation pan 44 and is conveyed towards the cleaning system 26. The cleaning system comprises a series of sieves and a cleaning fan 52. The series of sieves includes a pre-cleaning sieve 46, an upper (or chaffer) sieve 48 and a lower (or shoe) sieve 50. The cleaning fan 52 generates an airflow through the sieves 46, 48, 50 that impinges on the grain and small MOG thereon. The small MOG is typically lighter than the grain and is therefore separated from the grain as it becomes airborne. The small MOG is subsequently discharged from the combine harvester 10 via a straw hood 54.

The preparation pan 44 and pre-cleaning sieve 46 oscillate in a fore-to-aft manner to transport the grain and small MOG to the upper surface of the upper sieve 48. The upper sieve 48 is arranged vertically above the lower sieve 50 and also oscillate in a for-to-aft manner such that the grain and small MOG are spread across the two sieves 48, 50, while also permitting cleaned grain to pass through openings in the sieves 48, 50 under the action of gravity.

Cleaned grain falls to a clean grain auger 56 that is positioned below and in front of the lower sieve 50 and spans the width of the combine harvester 10. The clean grain auger 56 conveys the cleaned grain laterally to a vertical grain elevator 60, which is arranged to transport the cleaned grain to the grain tank 28. Once in the grain tank 28, grain tank augers 68 at the bottom of the grain tank convey the cleaned grain laterally within the grain tank 28 to an unloading tube 30 for discharge from the combine harvester 10.

Figure 2:
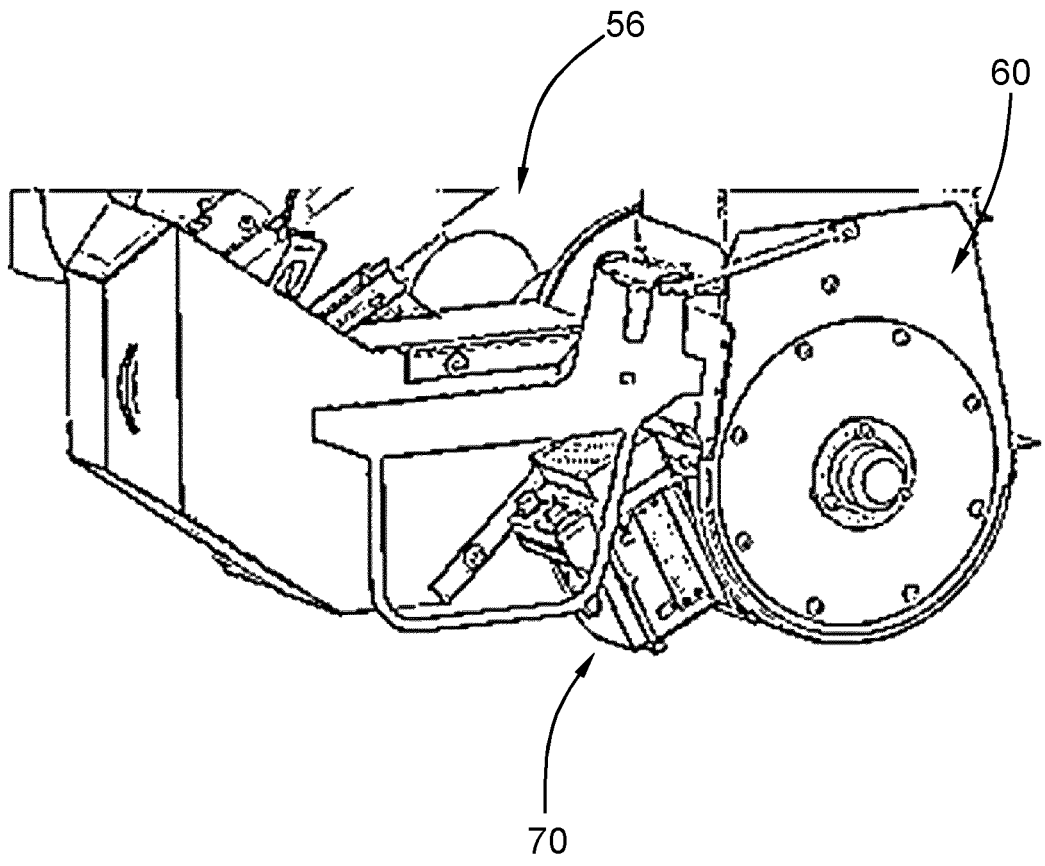
FIG. 2 shows a view of a grain elevator and a clean grain auger that form part of the agricultural harvester of FIG. 1.

FIG. 2 shows a bottom portion of the grain elevator 60 at the joint between the clean grain auger 56 and the grain elevator 60. In the view shown in FIG. 2, the clean grain auger 56 extends back into the page. A sensor assembly 70 is engaged with the bottom of the grain elevator 60.

Figure 3:
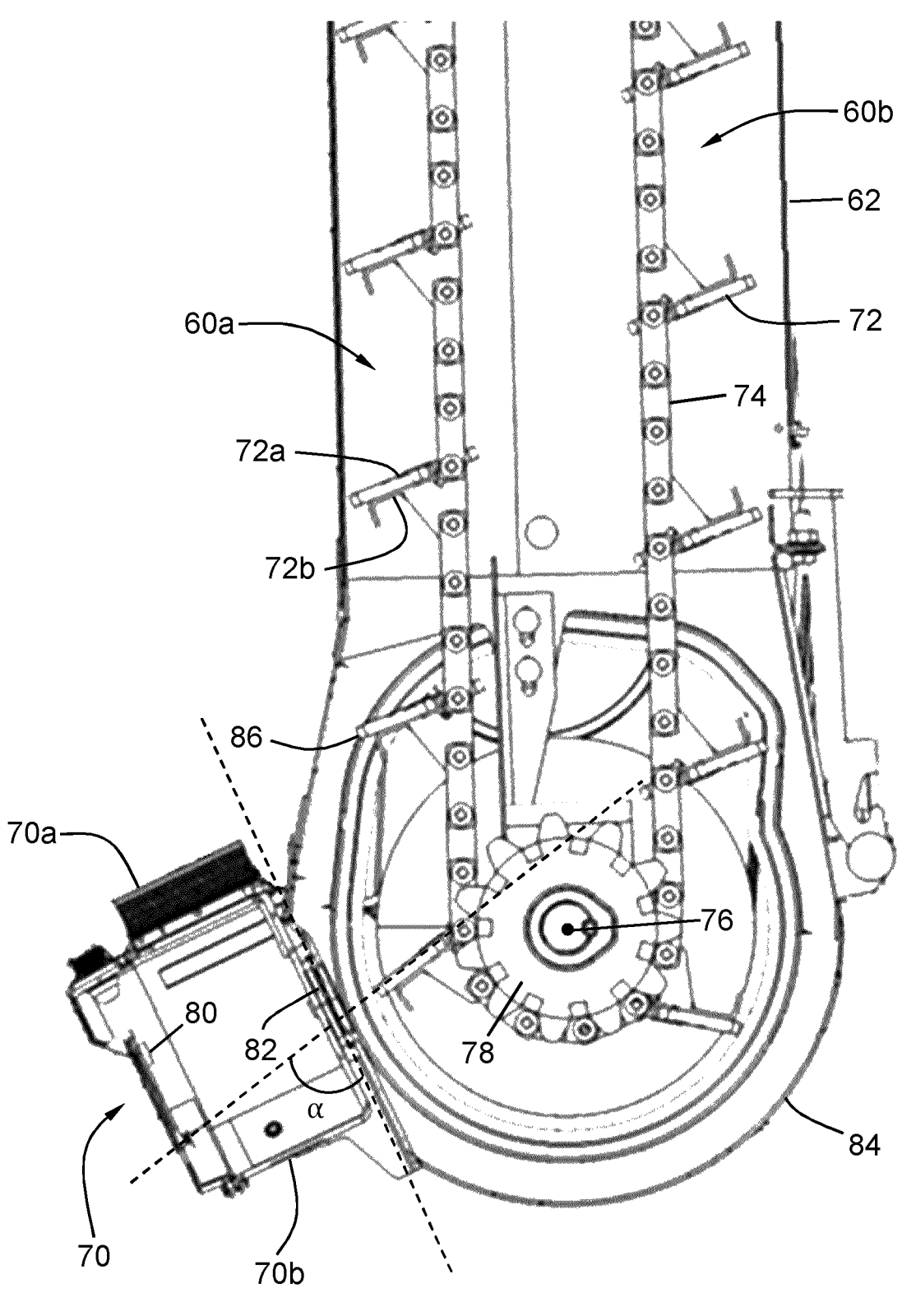
FIG. 3 shows a cross-sectional view of the grain elevator of FIG. 2.

FIG. 3 shows the bottom portion of the grain elevator 60 in further detail and reveals that the grain elevator 60 comprises a paddle loop comprising a plurality of paddles 72 housed within an elevator housing 62. The paddles are arranged on a chain 74 that traverses around a lower rotation axis 76 and an upper rotation axis (not shown) such that the chain 74 and paddles 72 can loop around the grain elevator 60. The paddles 72 pick up the cleaned grain at a downstream end of the clean grain auger 56 and convey it upwards into the grain tank 28. Although the grain elevator 60 is shown in the Figures here as being vertical, it should be understood that the grain elevator may be oriented in any way that allows grain to be conveyed from the clean grain auger 56 to the grain tank 28.

The chain 74 is driven by drive means in the form of sprockets 78, of which only a lower sprocket is shown in FIG. 3. The sprockets 78 are arranged to be co-axial with the upper and lower rotation axes. Teeth on the sprocket 78 engage with gaps in the chain 74, allowing the chain 74 to be driven by the rotary motion of the sprockets 78. Rotary motion of the sprockets 78 therefore causes the paddles 72 to loop around the grain elevator 60 around the rotation axes 76 and thereby convey cleaned grain from the bottom of the grain elevator 60 to the top, from where the cleaned grain can be unloaded to the grain tank 28.

In the configuration shown in FIG. 3, the sprockets 78 rotate clockwise to define an upward traveling side 60a and a downward traveling side 60b of the grain elevator 60. Therefore, the paddles 72 have a leading edge 72a, on which cleaned grain is carried during transport up the grain elevator 60, and a trailing edge 72b that forms a bottom of the paddles 72.

FIG. 3 also shows that the sensor assembly 70 comprises an NIR sensor 80 for detecting properties of the cleaned harvested grain and a sensor window 82, arranged to enable infrared light to travel between the NIR sensor 80 and the cleaned harvested grain. As can be seen in FIG. 3, the sensor window 82 is embedded in a boot portion 84 of the elevator housing 62 at a point that is below the lower rotation axis 76. The boot portion 84 is concave, as opposed to the remainder of the elevator housing 62, which has substantially straight walls.

Specifically, the sensor window is positioned adjacent the upward traveling side 60a of the grain elevator 60. There is a clearance between an outer paddle end 86 and the sensor window 82 that increases as each paddle 72 passes the sensor window 82 up to a maximum clearance of approximately 35 mm. This is due to the inclination of the sensor window 82 and sensor assembly 70, which is such that an inclination angle α of between about 40° and about 120°, preferably between about 60° and about 100°, is defined between the sensor window 82 and the upper surface 72a of a passing paddle 72 when the outer paddle end 86 is closest to the centre of the sensor window 82. The additional clearance between the outer paddle end 86 and the sensor assembly 70 nearer its upstream end 70a creates a leakage effect of cleaned grain spilling off of the leading edges 72a of the paddles 72.

This configuration differs from the current state of the art, where sensor assemblies 70 are often positioned at the outlet of the grain elevator 60. As alluded to, positioning of the sensor assembly 70 at this location can result in inconsistent grain flow past the sensor window 82, reducing the quality of measurements made thereby.

The leakage effect of cleaned grain created by the increased clearance between the outer paddle end 86 and an upstream end 70a of the sensor assembly 70 results in an accumulation of grain that has spilled off of the paddles 72 in the zone wherein the sensor window 82 is embedded. This therefore creates a more continuous and consistent flow of grain past the sensor window 82, allowing measurement of grain parameters carried out by the sensor assembly to be more accurate and more reliable.

The fact that the sensor window 82 is embedded in the elevator housing 62 in the boot portion 84 also has the effect of making grain flow more consistent and continuous past the sensor window 82. This is due to the fact that the boot portion is the region where grain flow is redirected from horizontal in the clean grain auger 56 to vertical in the grain elevator 60.

An additional advantage of not positioning the sensor assembly 70 near the top of the grain elevator 60 is that its performance is not affected by the operation of a tensioning system. Grain elevator tensioning systems are generally needed for compensating for wear in the elevator chain 74. Typically, the upper sprocket 78 (seen in FIG. 5) can be moved up and down in order to compensate for the gradual lengthening of the chain 74. Had the sensor assembly 70 been placed in the vicinity of the upper sprocket 78, the tensioning of the chain 74 would have changed the clearance between the sensor window 82 and the passing paddle end 86. By placing the sensor assembly 70 at the boot portion 84 or straight portion 62 of the grain elevator, this problem is avoided.

Finally, the positioning of the sensor window 82 adjacent to the upward traveling side 60a of the grain elevator 60 also means that grain flow past the sensor window 82 is more consistent and continuous. The clearance range between the outer paddle end 86 and the sensor window ensures that cleaned grain to be examined by the sensor assembly 70 is in direct contact or is very close to the sensor window 82, making measurements taken by the sensor assembly 70 more reliable and accurate.

Figure 4:
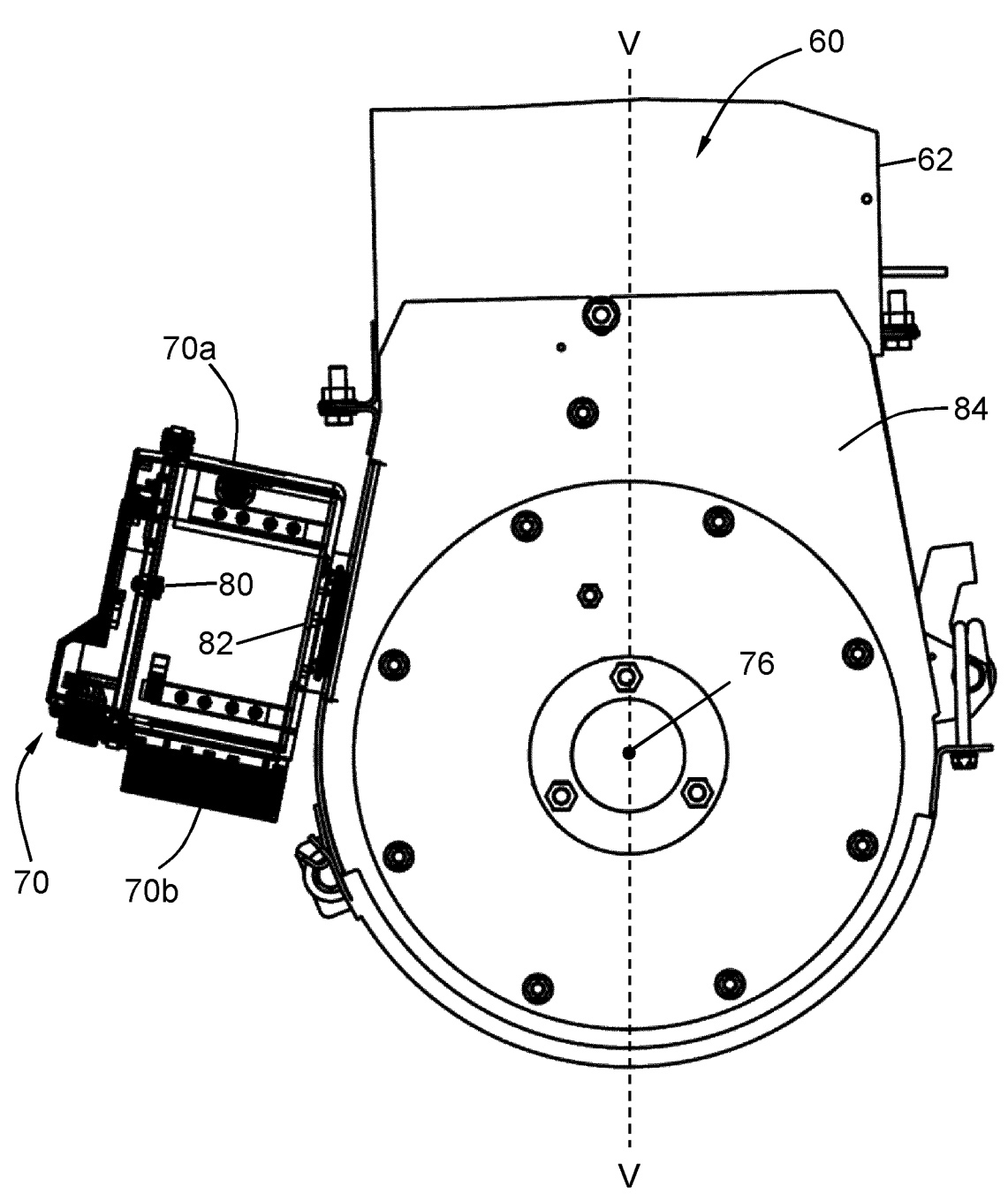
FIG. 4 shows a grain elevator in accordance with an alternative embodiment of the invention.

FIG. 4 shows an alternative embodiment of the sensor assembly 70 and boot portion 84 of the grain elevator 60. In this embodiment, the sensor assembly 70 is positioned such that the sensor window 82 is embedded in the elevator housing 62 at a point which is above the lower rotation axis 76. The sensor assembly 70 shown in FIG. 4 is inclined in the opposite sense to that shown in FIG. 3, with the upstream end 70a closer to a vertical centreline V-V of the grain elevator 60 than the downstream end 70b. However, the inclination angle α of the sensor assembly is similar to that shown in FIG. 3, i.e. between approximately 40° and 120°, preferably between 60° and 100°. Although this embodiment does not benefit from the grain leakage as described with reference to the embodiment of FIG. 3, the narrowing of the grain transport channel near the sensor window 82 may bring other advantages. An accumulation of grain at the sensor window 82 will, e.g., help to ensure constant contact between sensor window 82 and the passing grain kernels.

Figure 5:
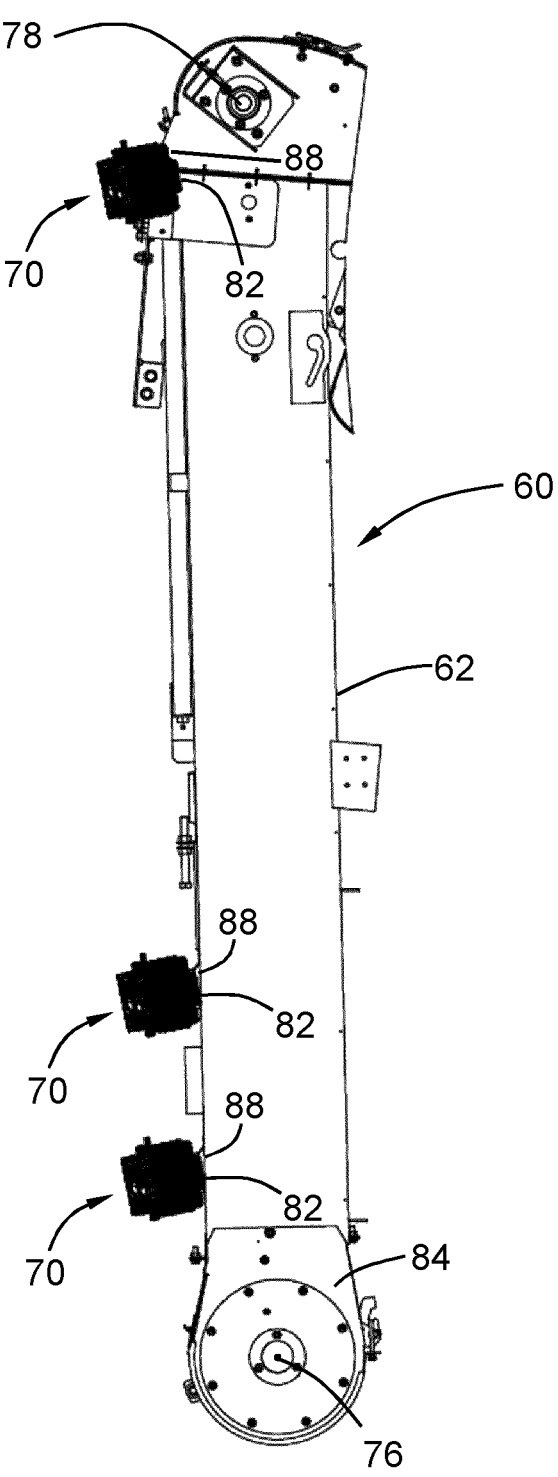
FIG. 5 shows a grain elevator in accordance with another alternative embodiment of the invention.

FIG. 5 shows the grain elevator 60 and boot portion 84 with a number of alternatively positioned sensor assemblies 70, embedded at various points along the elevator housing 62. It should be explicitly understood that, while FIG. 5 shows multiple sensor assemblies 70, it is certainly possible, but not intended that multiple sensor assemblies 70 be used at the same time in any embodiment of the invention. It should also be understood that the positioning of the sensor assemblies 70 shown in FIG. 5 are for example only and that other positions along the elevator housing 62 may be chosen. In these embodiments, the width of the grain elevator 60 is slightly enlarged in the region of the sensor assemblies 70 to define leak zones 88 where the clearance between the sensor windows 82 and outer paddle ends 86 is increased. This has the same effect as the increasing clearance in the embodiment of FIG. 3; that grain flow is made more consistent and continuous past the sensor windows 82 embedded in the elevator housing 62. For the same reason, the sensor assemblies 70 shown in FIG. 5 are also inclined in the same way as in the embodiment shown in FIG. 3.

The effect of the leak zones 88 and inclination of the sensor assemblies 70 mitigates for the less consistent and continuous grain flow that is experienced in the main body of the grain elevator as opposed to the boot portion 84. In this embodiment, it is preferable for the sensor assemblies 70 to have their sensor windows 82 embedded in the elevator housing 62 in a lower half thereof, where grain flow is more consistent and continuous than in the upper half.

Many modifications may be made to the specific examples described above without departing from the scope of the invention as defined in the accompanying claims.

The invention claimed is:

1. A combine harvester comprising:
   a cleaning section;
   a grain tank; and
   a grain elevator, comprising:
      a paddle loop comprising a plurality of paddles for carrying harvested grain;
      a driver configured to drive the paddle loop and thereby move the paddles upward at a first side of the paddle loop and downward at a second side of the paddle loop, whereby the harvested grain is elevated from a lower point proximate a downstream end of the cleaning section to a higher point proximate a grain inlet of the grain tank;
      an elevator housing encompassing at least a portion of the paddle loop; and
      a sensor assembly comprising a NIR sensor for detecting properties of the harvested grain and a sensor window arranged for enabling infrared light to travel between the NIR sensor and the harvested grain;

wherein:

the sensor window is embedded in the elevator housing adjacent to the first side of the paddle loop; and the sensor window is inclined with respect to a direction of movement of the paddles, such that, in use, a clearance between an outer end of one of the paddles and the sensor window increases while the one of the paddles passes the sensor window.

2. The combine harvester of claim 1, wherein the sensor window is embedded in the elevator housing at a position where, in use, harvested grain carried upward by one of the paddles is in sliding contact with the sensor window.

3. The combine harvester of claim 1, wherein the sensor window is embedded in the elevator housing at a position where, in use, a clearance between an outer end of the paddles and the sensor window is between about 10 mm and about 35 mm.

4. The combine harvester of claim 1, wherein an angle between the sensor window and an upper surface of a passing paddle is between about 40° and about 120° when an outer end of the passing paddle is closest to a center of the sensor window.

5. The combine harvester of claim 1, wherein the elevator housing comprises a leak zone configured such that, in use, a clearance between an outer end of the paddles and the elevator housing is larger in the leak zone than immediately upstream and downstream thereof, and wherein the sensor window is at least partially embedded in the leak zone.

6. The combine harvester of claim 1, wherein the sensor window is embedded in a lower half of the elevator housing.

7. The combine harvester of claim 1, wherein the elevator housing comprises a concave portion at its bottom and a substantially straight portion above the concave portion, and wherein the sensor window is at least partially embedded in the substantially straight portion of the elevator housing.

8. The combine harvester of claim 1, wherein the elevator housing comprises a concave portion at its bottom and a substantially straight portion above the concave portion, and wherein the sensor window is at least partially embedded in the concave portion of the elevator housing.

9. The combine harvester of claim 1, wherein the paddle loop loops around an upper rotational axis and a lower rotational axis, and wherein the sensor window is embedded in the elevator housing at a position that is at least partially above the lower rotational axis.

10. The combine harvester of claim 1, wherein the paddle loop loops around an upper rotational axis and a lower rotational axis, and wherein the sensor window is embedded in the elevator housing at a position that is at least partially below the lower rotational axis.

* * * * *